US012179049B1

(12) United States Patent
MacDonald

(10) Patent No.: US 12,179,049 B1
(45) Date of Patent: Dec. 31, 2024

(54) FIRE SUPPRESSION TRAILER HAVING WHEEL WITH ARTICULATING AXEL

(71) Applicant: William D. MacDonald, Whitehall, MI (US)

(72) Inventor: William D. MacDonald, Whitehall, MI (US)

( * ) Notice: Subject to any disclaimer, the term of this patent is extended or adjusted under 35 U.S.C. 154(b) by 0 days.

(21) Appl. No.: 18/408,457

(22) Filed: Jan. 9, 2024

Related U.S. Application Data

(60) Provisional application No. 63/479,174, filed on Jan. 9, 2023.

(51) Int. Cl.
A62C 27/00 (2006.01)
A62C 3/07 (2006.01)
B60G 17/017 (2006.01)
B62D 63/08 (2006.01)

(52) U.S. Cl.
CPC .............. A62C 27/00 (2013.01); A62C 3/07 (2013.01); B60G 17/017 (2013.01); B62D 63/08 (2013.01); B60G 2500/30 (2013.01)

(58) Field of Classification Search
CPC .... A62C 2/00; A62C 2/06; A62C 2/24; A62C 3/07; A62C 27/00; B60G 17/017; B60G 2500/30; B62D 63/08
USPC ......................................... 169/48–50, 52, 62
See application file for complete search history.

(56) References Cited

U.S. PATENT DOCUMENTS 4,433,733 A * 2/1984 Cunningham .......... E21B 35/00
169/69
2019/0118013 A1* 4/2019 Brubakken ............... A62C 3/07

* cited by examiner

Primary Examiner — Christopher S Kim
(74) Attorney, Agent, or Firm — Frank M. Scutch, III

(57) ABSTRACT

A fire suppression trailer for use with electric vehicles includes a floorless enclosure having an articulating axle for movement over a burning vehicle which can be lowered to the ground. This enables a vehicle fire to be easily contained therein preventing further damage to adjacent vehicle or buildings. The trailer further includes a longitudinal door allowing viewing and nitrogen extinguishers to be used on the fire. A storage area for storing a fire blanket is configured above the trailer wheels and can be deployed over the wheel to prevent damage during the fire.

11 Claims, 4 Drawing Sheets

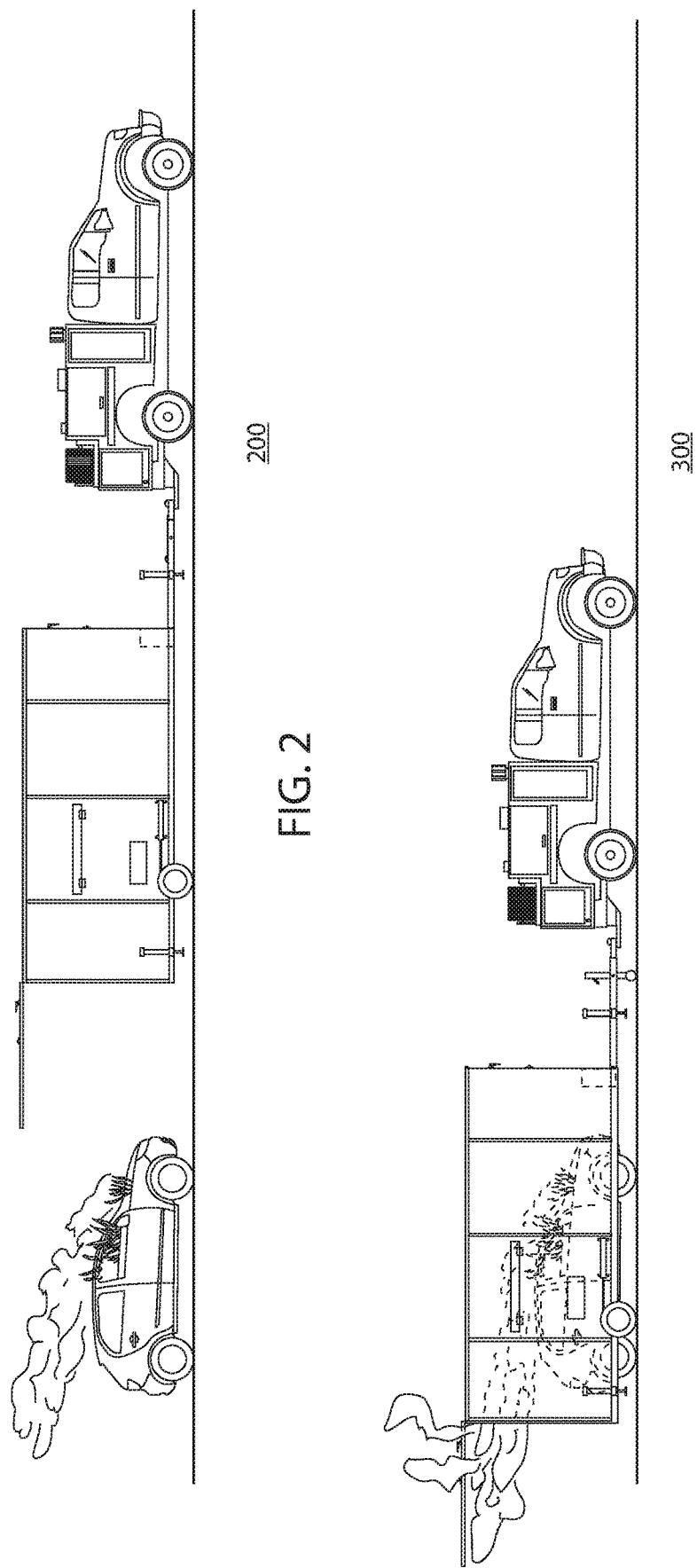

FIRE SUPPRESSION TRAILER HAVING WHEEL WITH ARTICULATING AXEL

FIELD OF THE INVENTION

The present invention relates generally to fire suppression and more particularly to a fire suppression containment system for electric vehicles.

BACKGROUND

Electric vehicles use high-capacity battery technology to supply power to the vehicle's electric motor. These batteries must be charged periodically to replenish their energy capacity. Lithium-ion battery technology is inherently dangerous if the battery is damaged or its charging is not done according to a predetermined algorithm. This can result in high heat and/or a fire event during the charging process. Lithium battery charging inherently makes an oxygen by-product that can make a fire more difficult to extinguish. Accordingly, fire suppression solutions are required to mitigate these fire dangers while charging batteries in electric vehicles.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a side view of the trailer shown in FIG. 1 with its rear door open for receiving a burning vehicle.

FIG. 3 is a side view of the trailer shown in FIG. 1 with the trailer moved over the burning vehicle.

Figure 1:
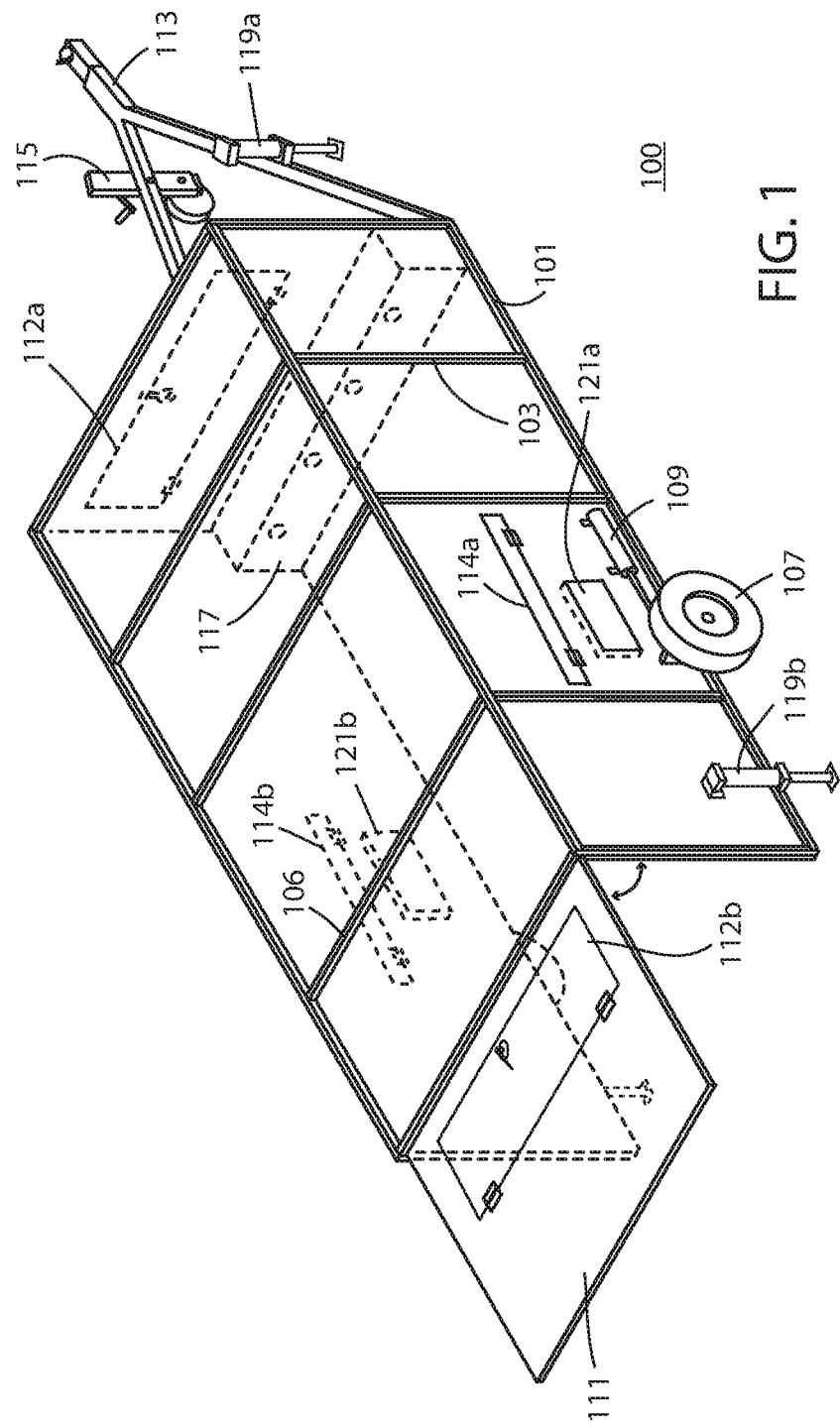
FIG. 1 is an elevated perspective view illustrating a fire suppression trailer having an articulating axle.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to fire suppression trailer having an articulating axle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is an elevated perspective view illustrating a fire suppression trailer having an articulating axle. The fire suppression trailer 100 includes a frame comprised of a plurality of lower members 101, vertical members 103, upper members 105 and roof members 106. A plurality of metal sheets and/or non-flammable panels are configured across and/or between each of the various members so to provide a housing having no floor. The metal sheets or panels are non-flammable allowing any fire within the enclosure to be contained. In alternative embodiments, an opening may be included at the top of the enclosure so firefighters can gain access and apply fire suppressant foams and/or gasses from above.

The trailer 100 includes wheels 107 mounted on an independent articulating axle 109. The articulating axle 109 enables each of the wheels to independently move in an arc-like motion so that when the wheel 107 is in a lowered position, the wheel touches the ground raising the trailer for transport. When the wheel 107 is in a raised position the lower member 101 touches the ground to seal the enclosure against the ground enabling the trailer to contain a fire. A rear door 111 pivots from the trailer rear ceiling enabling it to enclose the rear of the trailer 100 when a vehicle is moved therein.

Further, one or more doors 112a, 112b are included at the front and rear of the trailer 100 respectively enabling firefighters to see inside the trailer to determine the status of an ongoing fire. Similarly, hinged doors 114a, 114b are configured so to have a substantially narrow profile enabling firefighters to see into the interior of the trailer 100 and apply nitrogen fire extinguishers when needed. For example, the doors 114a 114b at sized 6 ft long×2 ft tall and are hinged at their bottom so they may easily remain open. This narrow, longitudinal type profile of the door 114a, 114b enables a nitrogen extinguisher to easily be used to cool a lithium fire making working conditions safer for firefighting personnel. In alternative embodiments, these longitudinal doors 114a, 114b may also include tempered glass or other materials enabling firefighters to view the vehicle in the enclosure while the doors are closed.

The trailer 100 is hitched to a utility vehicle such as a fire truck using a tow hitch 113. A winch 115 can be used to pull the trailer 100 into a desired position. An optional toolbox or front storage box 117 can be configured within an inside front areas of the trailer as needed. In alternative embodiments, the storage box 117 can be used to house fire suppressant gas or the like. Hydraulic jacks 119a, 119b can be used at the perimeter of trailer 100 for raising the trailer from the ground enabling the axle to be articulated between raised and lowered positions. Further, a box like storage container 121 is configured above each wheel 107. The storage container 121 houses a fire blanket that can be unfolded and draped over the respective wheel 107 during a fire to prevent heat from damaging each tire.

Figures 4, 5:
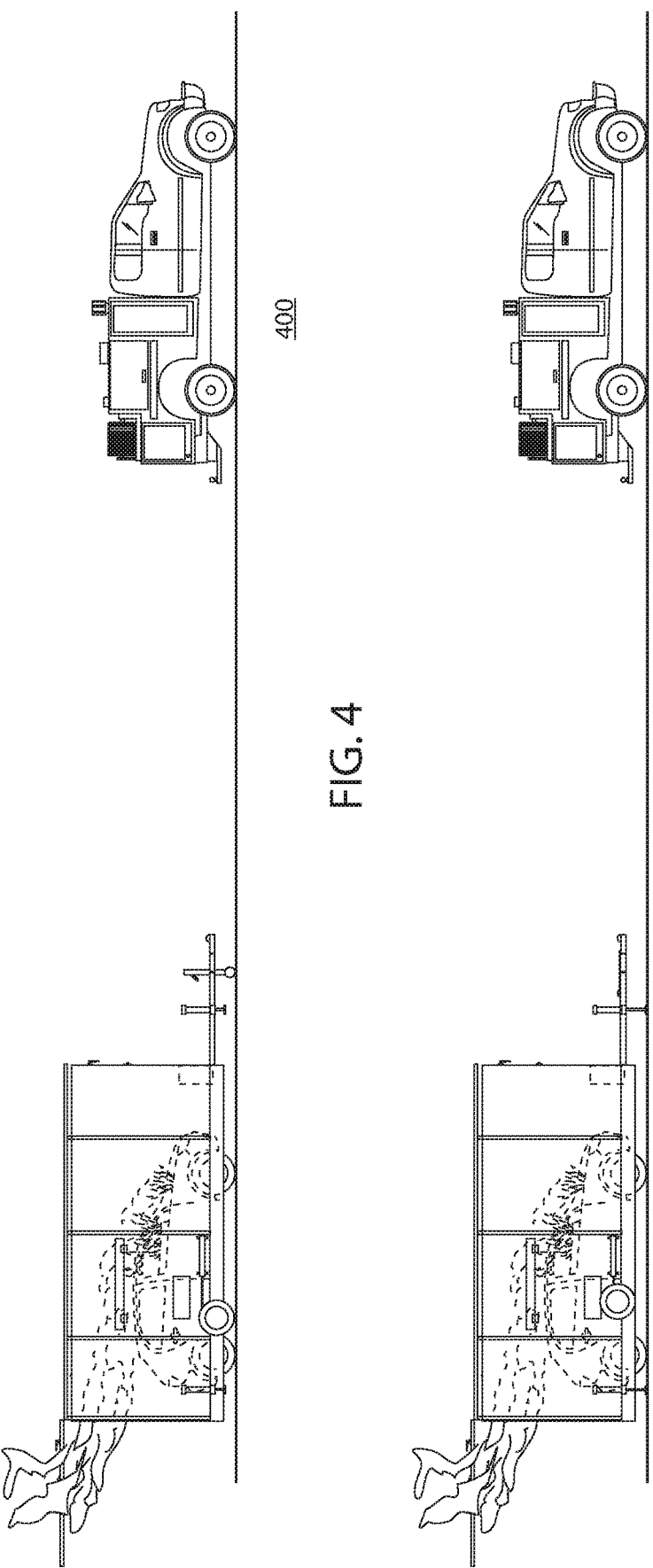
FIG. 4 is a side view of the trailer shown in FIG. 1 with the trailer over the vehicle and the utility vehicle disconnected from the trailer
FIG. 5 is a side view of the trailer shown in FIG. 1 with the trailer over the vehicle and its wheels raised before lowering the trailer to the ground with jacks.
Figure 6:
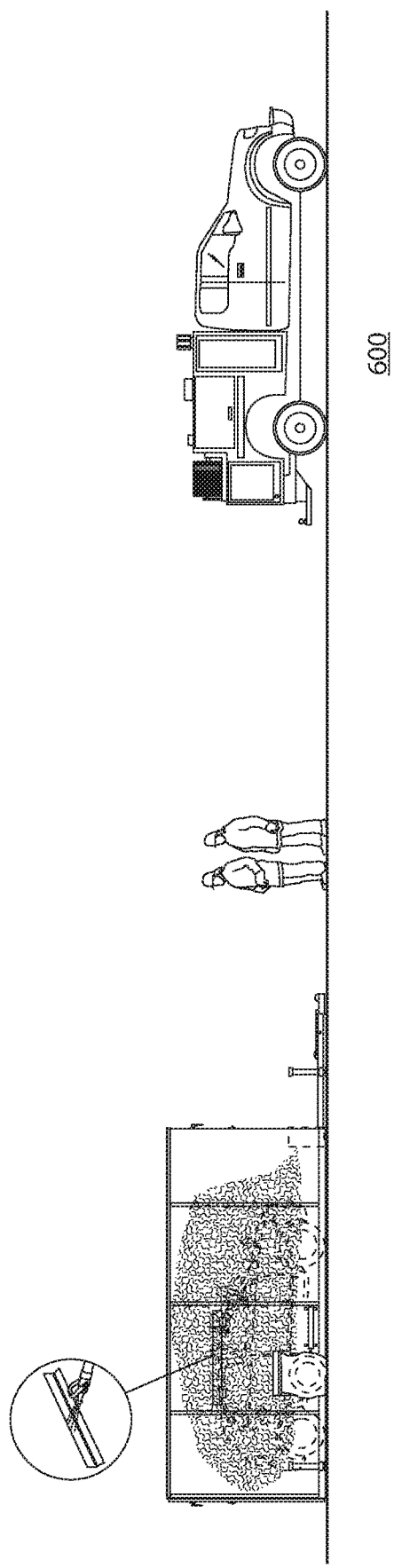
FIG. 6 is a side view of the trailer shown in FIG. 1 with the rear door closed, the trailer contacting the ground for containing the fire within the trailer.

FIGS. 2-5 illustrate various configurations where the fire suppression trailer is used for containing a vehicle fire. More specifically, FIG. 2 is a side view of the trailer 200 shown in FIG. 1 with its rear door open for receiving a burning vehicle. The trailer is shown hitched to a fire vehicle and the trailer is moved in reverse to fully cover and enclose a burning vehicle. FIG. 3 is a side view of the trailer shown in FIG. 1 where the trailer 300 is moved over the burning vehicle and the rear door of the enclosure is remains in an open position. FIG. 4 is a side view of the trailer as shown in FIG. 1 where the trailer 400 is positioned over the vehicle fire. The utility vehicle is disconnected and moved away from the trailer. FIG. 5 is a side view of the trailer shown in FIG. 1 where the trailer 500 is positioned directly over the vehicle and its wheels raised so the hydraulic jacks can lower the trailer to contract the ground. Finally, FIG. 6 is a side view of the trailer 600 shown in FIG. 1 where the trailer contacts the ground and the rear door is closed. The magnified view shows a top hinged side door open enabling viewing of the fire or application of fire suppressants such as nitrogen gases or foams. This enables the fire suppression trailer to fully contain a vehicle fire to prevent it from spreading to adjacent vehicles, buildings or enclosures. As lithium battery vehicle fires are long burning, those skilled in the art will recognize that in use, the burning vehicle is typically retained within the trailer enclosure for at a least a 48-hour period.

Thus, embodiments of the present invention are directed to a fire suppression trailer having and enclosure with no floor. The trailer includes articulating wheels enabling it to be easily moved over a burning vehicle and lowered to the ground allowing a vehicle fire to be easily contained.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. An electric vehicle fire suppression trailer comprising:
   a frame for supporting an enclosure having no floor;
   a plurality of wheels sharing an articulating axle for enabling the enclosure to be move between a raised and a lowered position where the frame contacts the ground in a lowered position; and
   wherein a rear door of the trailer is configured between an open position when moving the enclosure over a vehicle fire and a closed position for fully containing the vehicle fire for preventing the vehicle fire from spreading to other vehicles or buildings.

2. An electric vehicle fire suppression trailer as in claim 1, further comprising a longitudinal door configurated on a side of the frame for allowing a nitrogen fire extinguisher to access a fire within the trailer.

3. An electric vehicle fire suppression trailer as in claim 1, further comprising:
   a tongue configured on a front of the trailer enabling it to be towed.

4. An electric vehicle fire suppression trailer as in claim 1, further comprising:
   a storage box configured above each wheel for deploying a fire blanket over the wheel.

5. An electric vehicle fire suppression trailer comprising:
   a frame for supporting an enclosure having no floor;
   a plurality of wheels each having an articulating axle for enabling the enclosure to be move between a raised and a lowered position where the frame contacts the ground in a lowered position;
   a compartment configured above the plurality of wheels having a fire blanket stored therein for covering at least one of the plurality of wheels during a fire; and
   wherein a rear door of the trailer is configured between an open position for moving the enclosure over a vehicle fire and a closed position for fully containing the vehicle fire preventing the vehicle fire from spreading to other vehicles or buildings.

6. An electric vehicle fire suppression trailer as in claim 5, further comprising a longitudinal door configured on a side of the frame for allowing a nitrogen fire extinguisher to access a fire within the trailer.

7. An electric vehicle fire suppression trailer as in claim 5, further comprising:
   a tongue configured on a front of the trailer enabling it to be towed.

8. An electric vehicle fire suppression trailer as in claim 5, further comprising:
   a front storage box at a front of the trailer for housing a fire suppressant gas.

9. An electric vehicle fire suppression trailer comprising:
   a frame for supporting an enclosure having no floor;
   a plurality of wheels each having an articulating axle for enabling the enclosure to be move between a raised and a lowered position where the frame contacts the ground in a lowered position;
   a compartment configured above the plurality of wheels having a fire blanket stored therein for covering at least one of the plurality of wheels during a fire;
   a plurality of jacks configured about the perimeter of the frame for lifting the frame from the ground without use of the articulating axle; and
   wherein a rear door of the trailer is configured between an open position for moving the enclosure over a vehicle fire and a closed position for fully containing the vehicle fire preventing the vehicle fire from spreading to other vehicles or buildings.

10. An electric vehicle fire suppression trailer as in claim 9, further comprising:
    a tongue configured on a front of the trailer enabling it to be towed.

11. An electric vehicle fire suppression trailer as in claim 9, further comprising:
    a front storage box at a front of the trailer for housing a fire suppressant gas.

* * * * *